(No Model.)
H. O. LITTLE.
FRUIT BOX OR BASKET.
No. 600,920. Patented Mar. 22, 1898.
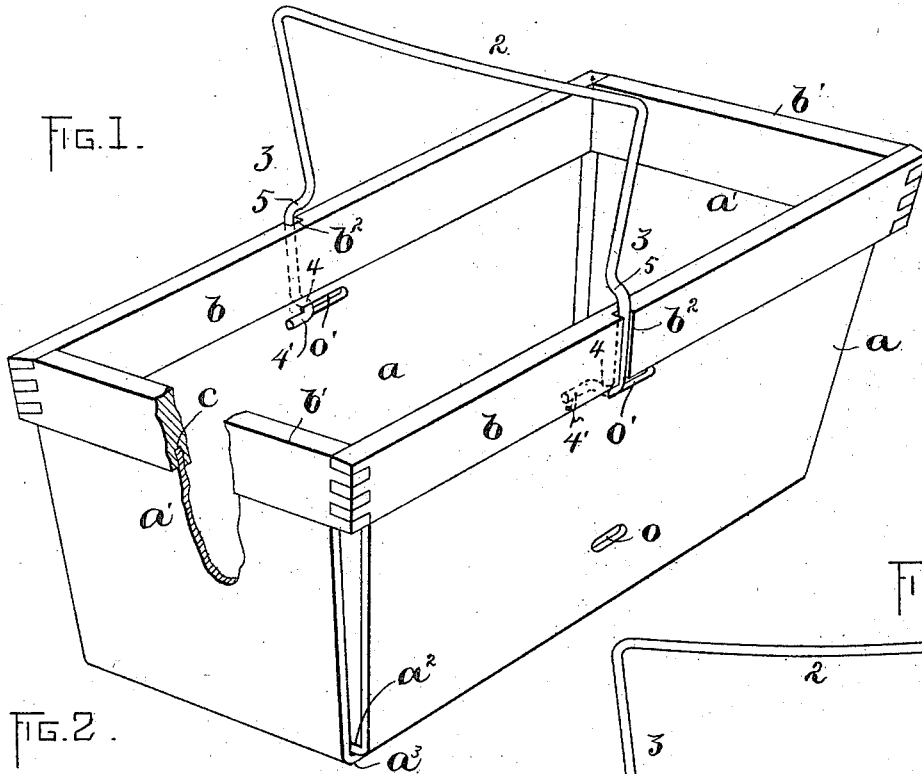
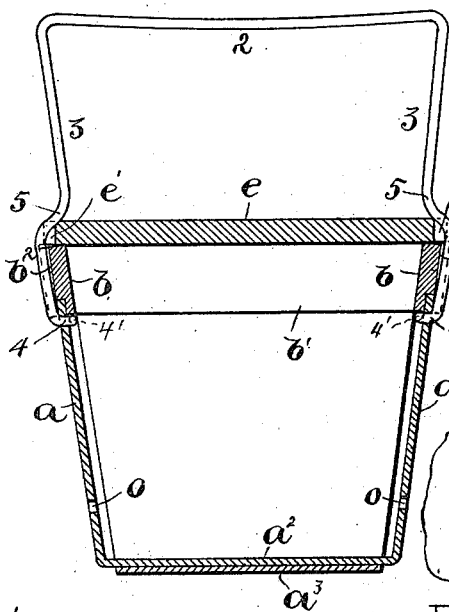
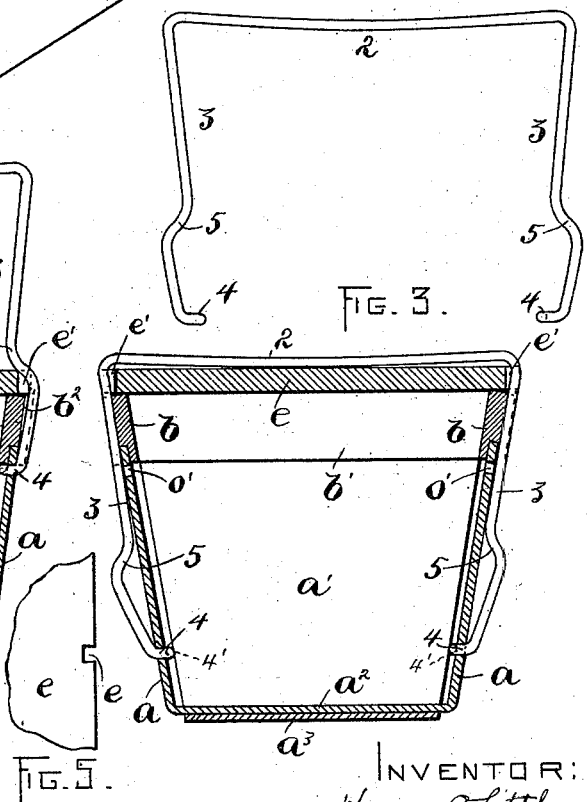
WITNESSES.
A. D. Hanson
P. W. Pezzetti
INVENTOR:
Henry O. Little
by Wright Brown & Quinby
Attys.

UNITED STATES PATENT OFFICE.

HENRY O. LITTLE, OF BRIDGEWATER, MASSACHUSETTS.

FRUIT BOX OR BASKET.

SPECIFICATION forming part of Letters Patent No. 600,920, dated March 22, 1898.

Application filed December 6, 1897. Serial No. 660,861. (No model.)

*To all whom it may concern:*

Be it known that I, HENRY O. LITTLE, of Bridgewater, in the county of Plymouth and State of Massachusetts, have invented certain new and useful Improvements in Fruit Boxes or Baskets, of which the following is a specification.

This invention has for its object to provide a fruit-box which shall be at once strong and durable and of inexpensive construction.

The invention also has for its object to provide a box or basket in which the cover shall be held against both horizontal and vertical movement by the handle.

The invention consists in the improvements which I will now proceed to describe and claim.

Of the accompanying drawings, forming a part of this specification, Figure 1 represents a perspective view of a fruit box or basket embodying my invention. Fig. 2 represents a transverse sectional view of the same, showing the handle raised. Fig. 3 represents a view similar to Fig. 2, showing the handle depressed and positively holding the box-cover down upon the rim of the box. Fig. 4 represents a view of the handle or bail removed from the box. Fig. 5 represents a top view of a portion of the cover of the box.

The same letters and numerals of reference indicate the same parts in all the figures.

In the drawings, $a$ $a$ and $a'$ $a'$ represent the wall-pieces of a fruit box or basket, said pieces being made of thin strips of wood or other suitable material and connected at their lower edges with a suitable bottom. I have here shown the bottom of the box as composed of two strips $a^2$ $a^3$. The strip $a^2$ is integral with the wall-pieces $a$ $a$, while the strip $a^3$ is integral with the wall-pieces $a'$ $a'$. The wall-pieces and bottom of the box are therefore composed in this case of two strips, each of which is suitably scored and bent to form three parts or divisions, the central portions of which are creased to form the bottom, while the end portions are bent upwardly from the bottom to form the walls. I do not limit myself, however, to this manner of forming the box-bottom, as the same may be of any other suitable construction.

The rim of the box or basket is composed of stiff strips $b$ $b$ $b'$ $b'$, of wood or other suitable material, which are much thicker than the wall-pieces and are suitably connected at their ends to form a frame and provided in their lower edges with grooves $c$, which are formed to receive the upper edges of the wall-pieces $a$ $a$ $a'$ $a'$, the said upper edges fitting closely in said grooves and being secured therein by glue, which forms glue-joints between the wall-pieces and the sides of the grooves. The ends of the strips $b$ and $b'$ are provided with tongues and grooves which are interlocked, as clearly shown in Fig. 1, and united by glue-joints.

It will be seen that a frame composed of strips grooved in their lower edges and united to the wall-pieces by glue-joints and tongued and grooved at their ends, said ends being also united by glue-joints, constitutes a stiff and practically rigid top, which is free from liability to be compressed and therefore prevents the crushing of the contents of the box. The joint formed by the grooves in the strips $b$ $b'$, the edges of the wall-pieces $a$ $a'$, and the glue interposed between said parts constitutes a practically continuous connection between the rim and the wall-pieces of the box, making said parts practically inseparable. The rim connected, as described, with the wall-pieces of the box gives the box a sufficient degree of strength without making its bottom of rigid construction, said rim permitting the employment of a bottom made as shown in the drawings, so that the cost of the box may be reduced to the minimum without sacrificing strength and durability.

The sides of the longitudinal grooves in the rim-strips are preferably inclined inwardly toward the bottom of the box, the wall-pieces being correspondingly inclined. This inclination not only makes the stiff and rigid top larger than the bottom, so that said top more effectually protects the contents of the box from being crushed than it would be if the top and bottom were of the same size, but also causes an interlocking of the wall-pieces with the sides of the grooves, thus strengthening the union between the wall-pieces and the rim-strips. The construction of the wall-pieces and the bottom in two crossed strips, as shown, enables the inclined wall-pieces to be inserted successively in the inclined grooves, so that the parts may be quickly and easily assembled.

The box is provided with an adjustable handle or bail composed of a length of wire bent to form a cross-bar 2, arms 3 3, formed on the ends of the cross-bar, and ears 4 4, bent inwardly from the ends of the arms 3 3. The wire forming said handle or bail is resilient and is originally formed so that normally the arms 3 3 will be inclined, as shown in Fig. 4, thus adapting them to the inclination of the sides of the box. The wall-pieces $a\,a$ are provided with two sets or pairs of elongated orifices $o\,o$ and $o'\,o'$, the orifices $o$ being located near the bottom of the box, while the orifices $o'$ are just below the rim. By providing the two sets or pairs of independent orifices I provide for the locking of the bail in the depressed position shown in Fig. 3, and thus positively holding the cover $e$ down upon the rim of the box, so that it cannot be raised until the arms 3 3 have been sprung outwardly far enough to withdraw the ears 4 4 from the orifices $o\,o$. When it is desired to use the handle for the purpose of carrying the basket, it is raised, as shown in Figs. 1 and 2, and the ears 4 4 engage with the upper orifices $o'\,o'$. The cover $e$ is provided with slots $e'$ in its edges, said slots receiving the arms 3 3 and thus enabling said arms to prevent endwise displacement of the cover.

The strips $b\,b$ of the rim are provided in their outer surfaces with transverse slots $b^2$, arranged to receive the lower portions of the arms of the handle, the engagement of the arms with said slots preventing the box from swinging on the ears 4.

To enable the handle to hold the cover down upon the box when the handle is in its raised position, I bend the lower portions of the arms 3 to form inclines 5 5, which project inwardly over the rim of the box and extend above the upper surface of the cover, the lower portions of said inclines being engaged with the slots $e'$ in the edges of the cover. The distance between the upper portions of the inclines 5 5 is less than the distance between the inner ends of the slots $e'\,e'$, so that the inclines bear on the cover at the inner ends of the slots and prevent loose upward movement of the cover. The cover may be raised by applying sufficiently forcible upward pressure to one of its edges to spring outwardly the incline 5 engaged therewith, the said edge of the cover slipping by the incline into the wider space between the upper portions of the arms 3 3.

To prevent the arms from yielding or springing outward too freely, I make the ears 4 4 elbow-shaped, each ear being bent to form an extension $4'$ at right angles with the body of the ear. The orifices $o\,o'$ are elongated sufficiently to enable them to receive the extension $4'$, and the said orifices project from the lower ends of the slots $b^2$ toward one end of the box, so that when the extensions $4'$ are inserted in the orifices a lateral movement of the arms 3 will be required to engage the arms with the slots $b^2$ in the rim, said movement causing each extension $4'$ to bear on the interior of the box at one end of the orifice through which the ear of which it forms a part passes. The ears are thus locked to the box, so that they cannot spring out of the orifices therein. This result takes place when the handle is depressed as well as when it is raised. The inclines 5 stand out from the sides of the box when the handle is depressed and form loops by which the arms may be manipulated to insert and remove the ears.

I claim—

1. A fruit box or basket comprising a series of relatively thin wall-pieces connected at their lower ends with a suitable bottom and inclined outwardly therefrom, and a series of stiff, relatively thick wooden strips united at their ends to form a rim of greater area than the bottom of the box, inclined crosswise to conform to the inclination of the wall-pieces, and having longitudinal grooves in their lower edges in which the upper ends of the wall-pieces are secured, the said strips being solid above the wall-pieces and forming a practically rigid top or mouth which overhangs the wall-pieces and prevents crushing of the contents of the box, said strips also presenting inclined sides which permit the nesting of the box.

2. A fruit box or basket comprising a series of stiff wooden strips united at their ends to form a stiff rim or frame, said strips being provided in their lower edges with longitudinal grooves, the sides of which are inclined inwardly toward the bottom of the box, and relatively thin wall-pieces correspondingly inclined and connected at their lower edges with a suitable bottom, the upper edges of said inclined wall-pieces being inserted in the longitudinal grooves of the frame-strips and united to the inclined sides of said grooves by glue-joints, which are strengthened by the inclination of the wall-pieces and groove sides, the said inclined strips with the upper portions of the inclined wall-pieces and the glue-joints, forming a practically rigid top which is of greater area than the bottom, and prevents crushing of the contents of the box.

3. A fruit box or basket comprising a series of stiff wooden strips tongued and grooved at their ends and interlocked and united by glue-joints to form a stiff rim or frame, said strips being provided in their lower edges with longitudinal grooves, the sides of which are inclined inwardly toward the bottom of the box, and two relatively thin strips, the central portions of which are crossed to form a double bottom, while their end portions are bent upwardly and inclined outwardly from said bottom to form wall-pieces which are inserted at their upper edges in said inclined grooves, and united to the inclined walls thereof by glue-joints, which are strengthened by the inclination of the wall-pieces and grooved sides.

4. A fruit box or basket comprising stiff wooden strips united at their ends to form a stiff frame or rim, and provided with longitudinal grooves in their lower edges, two of said strips having transverse slots in their outer sides, relatively thin wall-pieces connected at their lower edges with a suitable bottom, and inserted at their upper edges in said grooves and united to the sides thereof, two of said wall-pieces having longitudinal orifices or perforations extending from the lower ends of said transverse slots toward one end of the box, and a detachable wire handle composed of a cross-bar, arms thereon, formed at their lower portions to enter said transverse slots, and having inclines projecting inwardly from the upper ends of said slots, and elbow-shaped ears on the lower ends of said arms formed to pass through said orifices and to bear on the inner sides of the perforated wall-pieces, said ears detachably holding the arms in engagement with the transverse slots of the side pieces, and securing the inclines in position to hold a cover.

5. A fruit box or basket comprising a series of stiff strips united at their ends to form a stiff frame and having longitudinal grooves in their lower edges, two of said strips having transverse slots in their outer sides, relatively thin wall-pieces connected at their lower edges with a suitable bottom and having their upper edges inserted in said grooves and united to the sides thereof, a wire bail or handle composed of a cross-bar and side arms engaged at their lower ends with said transverse slots, and having inclines projecting inwardly from the upper ends of said slots, and a cover having slots in its edges formed to engage the lower portions of said inclines.

6. A box or basket comprising a body portion having in its sides two pairs of orifices, one pair being above the other, and a handle composed of a cross-bar, arms thereon adapted to bear on the sides of the box, and elbow-shaped ears formed on said arms and adapted to enter the upper orifices to hold the handle in a raised position and to enter the lower orifices to lock the handle against the cover of the box.

7. A fruit box or basket comprising a body portion having in its side pieces two pairs of orifices, one pair being above the other, and a handle composed of a cross-bar, side arms adapted to bear against the side pieces, ears formed on said arms and adapted to engage the upper orifices to hold the cross-bar of the handle elevated, and the lower orifices to hold the cross-bar positively in a depressed position, and a cover having slots in its edges formed to interlock with the arms of the handle and prevent endwise displacement of the cover.

In testimony whereof I have signed my name to this specification, in the presence of two subscribing witnesses, this 1st day of December, A. D. 1897.

HENRY O. LITTLE.

Witnesses:
 WALTER S. LITTLE,
 L. M. BENSON.